Figure 3:
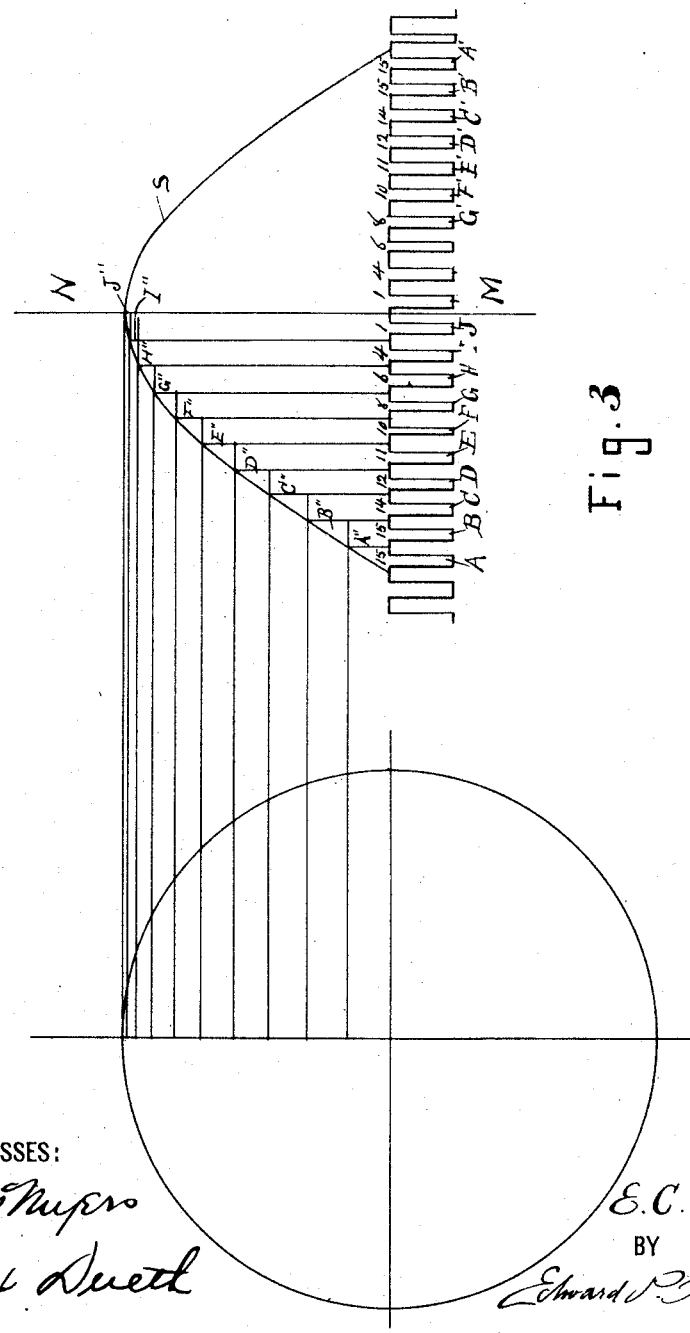

No. 618,578.      Patented Jan. 31, 1899.
E. C. NEWCOMB.
ALTERNATING CURRENT MOTOR.
(Application filed May 16, 1898.)
(No Model.)      2 Sheets—Sheet 1.
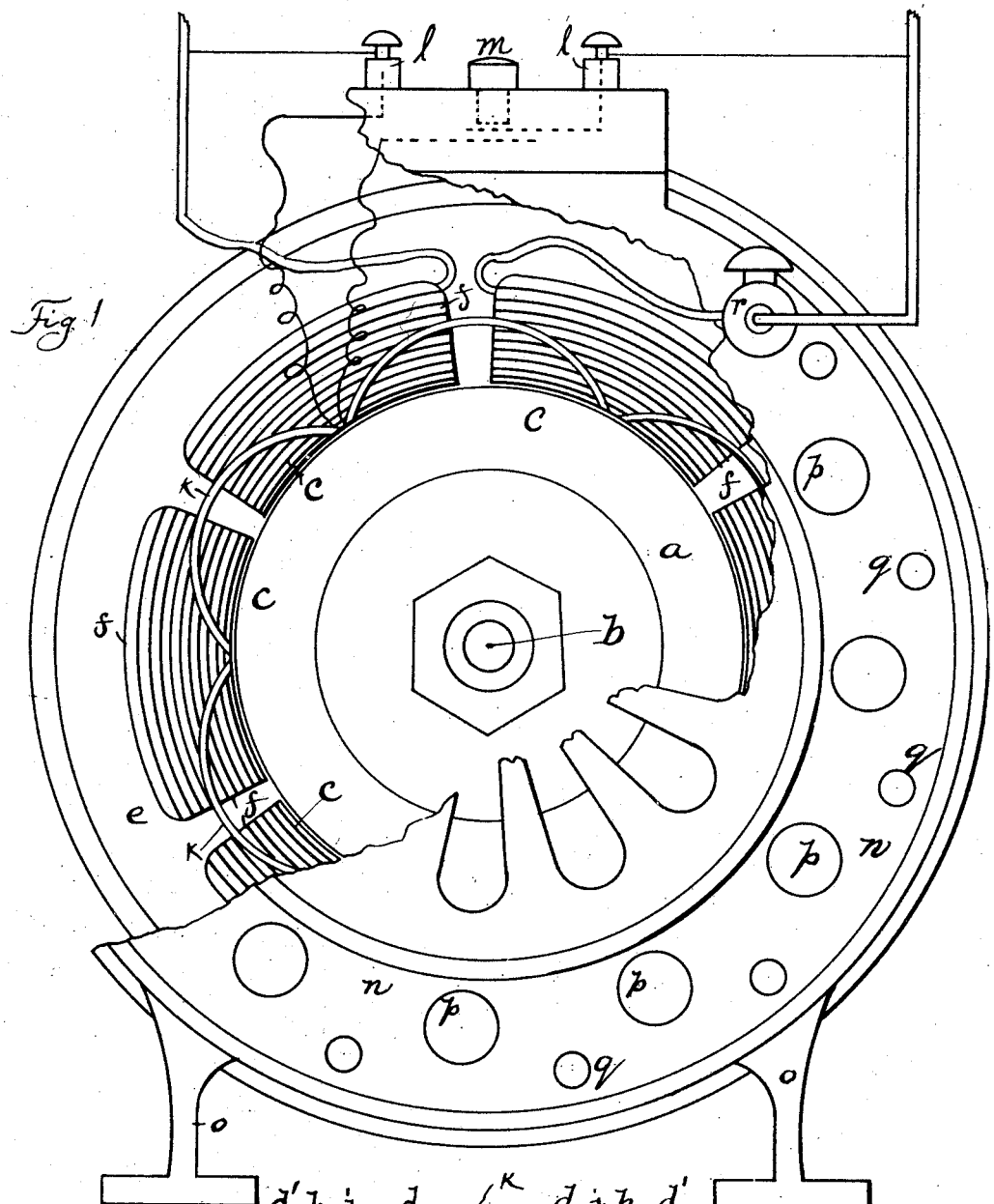
WITNESSES:      INVENTOR
J. E. Coleman.      Edw. C. Newcomb
E. C. Thompson.      BY Edward P. Thompson
      ATTORNEY No. 618,578. Patented Jan. 31, 1899.
E. C. NEWCOMB.
ALTERNATING CURRENT MOTOR.
(Application filed May 16, 1898.)
(No Model.) 2 Sheets—Sheet 2.

WITNESSES: INVENTOR
E. C. Newcomb
BY
ATTORNEY

UNITED STATES PATENT OFFICE.

EDWARD C. NEWCOMB, OF BROOKLINE, MASSACHUSETTS, ASSIGNOR TO THE HOLTZER-CABOT ELECTRIC COMPANY, OF SAME PLACE, BOSTON, MASSACHUSETTS, AND NEW YORK, N. Y.

ALTERNATING-CURRENT MOTOR.

SPECIFICATION forming part of Letters Patent No. 618,578, dated January 31, 1899.

Application filed May 16, 1898. Serial No. 680,820. (No model.)

*To all whom it may concern:*

Be it known that I, EDWARD C. NEWCOMB, a citizen of the United States of America, and a resident of Brookline, county of Norfolk, and State of Massachusetts, have invented a new and useful Improvement in Alternating Motors, of which the following is a specification.

The purpose of my present alternating-current motor is to obtain a field of force at each pole of the field-magnets that so varies in intensity from the extremities of the polar arc to the center that the curve representing the variation is approximately a sinusoid.

The style of motor to which I have shown my invention applicable in this application is that comprising a field-magnet adapted to be energized by an alternating electric current, a set of shunt-coils forming a secondary group of poles for the field-magnets for starting the motor, and an armature in which the conductors are electrically closed upon themselves. The slots extending radially into the core of the field-magnets are wound in such a manner as to carry out the purpose mentioned above, so that the ampere-turns are a maximum in number at the edges of the polar arcs and diminish gradually toward the center in a predetermined manner.

Figure 1 is an elevation of an actual motor built and operated in accordance with my invention, parts being broken away to show the interior construction as far as admissible, while Fig. 2 exhibits, in conjunction with Fig. 1, the windings in the slots, the figure being mostly in the nature of a diagram to illustrate the principle of winding. The polar arc is in this figure evolved rectilinearly, the radius of the arc being considered infinite. The conductors are shown cross-hatched, while the shunt-conductors are represented by dots. Fig. 3 shows the construction of a sinusoid and its application in the determination of the number of turns of an electric conductor to be wound in the slots provided in the motor.

Referring to the drawings, the motor consists of the combination of the armature $a$, of the closed-coil type, in which the coils are all closed upon themselves and mounted upon a laminated iron core that is provided with a shaft $b$, so that currents may be induced in the same in the well-known manner of the present alternating-current motor, field-magnets having coils $c$, wound in slots $d$ in the core $e$, the convolutions passing first back and forth from the outside slots $d'$, then to the next pair of slots toward the central part of the pole, then to the next pair, and so on, the number of ampere-turns diminishing according to a certain rule to the minimum at the pair nearest the center. To start with, the outside slots have the maximum convolutions, and then either the next one pair or two, &c., pairs have less convolutions, the ratio of decrease being that the field of force shall vary approximately in the true manner of an alternating-current wave in the field-magnet, and that is as hereinbefore stated. The first convolutions are lettered $f$, the second $g$, the third $h$, the fourth $i$, and so on. The shunt-coil $k$ is located in the empty part of the two central slots. The terminals end in the posts $l$ on the top of the machine, which are also the terminals of the field-magnet coils. A push-button $m$ is arranged for including the shunt-coils in circuit with the line when the motor is to be started.

The letter $n$ indicates the frame of the motor; $o$, the feet; $p$, the holes for ventilation; $q$, the holes for the retaining-bolts, and $r$ one of the main binding-posts of the motor.

I will now proceed to explain how the numbers of ampere-turns in the slots shall be determined in order that the curve representing the intensity of the magnetic field at different points is approximately a sinusoid. The number of turns may be determined by means of a diagram, as shown in Fig. 3. The slots of one of the poles are represented as evolved upon a plane from left to right at A B C D, &c., and from right to left at A' B' C' D', &c., the slots being equally spaced and of equal width. Ordinates of the sinusoid are drawn from the central points between the slots, the sinusoid terminating at opposite sides of the pole and representing the varying intensity of a wave of the alternating current employed. The increments $A^2$ $B^2$ $C^2$, &c., in the lengths of the ordinates of the sinusoid $o$, starting from its zero value, are proportional to the turns of the conductor in the succeeding slots. Thus the first and second slot having about fifteen turns, the third about fourteen turns, the slot D twelve turns, the slot E eleven turns, the slot F ten turns, the slot G eight turns, and so on, as indicated.

The operation of the motor is as follows: An alternating electric current of the single-phase kind is passed through the machine. The motor does not start. The button $m$ is therefore pressed, so that a current may pass through the coils $k$ for the purpose of starting the motor, which operates because the coils $k$ are thereby included in a shunt-circuit. When the circuit of the coils $k$ is opened, after the motor has reached a definite speed, the energy in the coils $f$ $g$ $h$, &c., maintains the motor in operation.

I have found by satisfactory proofs that a motor constructed according to this specification constitutes an improvement in the state of the art, the efficiency being unusually high.

I claim as my invention—

1. In an alternating-current motor, a field-magnet, whose numbers of ampere-turns gradually diminish from the outer edges of the poles to the center, by a sine function.

2. In an alternating-current motor, the combination of an armature, with coils closed upon themselves, a field-magnet with two sets of poles, the one set being in shunt-circuit to the other set, means for cutting in and cutting out the shunt-coils, the ampere-turns of the main coils gradually diminishing from the outer edges of the poles to the center by a sine function.

Signed by me this 12th day of May, 1898.

EDWARD C. NEWCOMB. [L. S.]

Witnesses:
ALBERT POLLARD,
W. H. HOLLAND.